H. N. MOTSINGER.
STORAGE BATTERY CIRCUIT CONTROLLER AND TESTER.
APPLICATION FILED FEB. 9, 1909.

972,210.

Patented Oct. 11, 1910.

Witnesses
Walter Troemel.
Thomas W. McMeans

Inventor
Homer N. Motsinger,
by Bradford Hood
Attorneys

UNITED STATES PATENT OFFICE.

HOMER N. MOTSINGER, OF PENDLETON, INDIANA, ASSIGNOR TO MOTSINGER DEVICE MFG. CO., OF PENDLETON, INDIANA, A CORPORATION OF INDIANA.

STORAGE-BATTERY CIRCUIT CONTROLLER AND TESTER.

972,210.

Specification of Letters Patent.  Patented Oct. 11, 1910.

Application filed February 9, 1909. Serial No. 477,014.

*To all whom it may concern:*

Be it known that I, HOMER N. MOTSINGER, a citizen of the United States, residing at Pendleton, in the county of Madison and State of Indiana, have invented certain new and useful Improvements in Storage-Battery Circuit Controllers and Testers, of which the following is a specification.

The object of my invention is to produce a neat and readily installed instrument adapted to be placed in the circuit between a storage battery and charging generator by means of which the current-productive value of either the generator or storage battery may be readily learned and by means of which the generator may be connected to the storage battery in such manner as to permit charging of the storage battery from the generator without interfering with the service duty being exacted from the storage battery.

Figure 1:
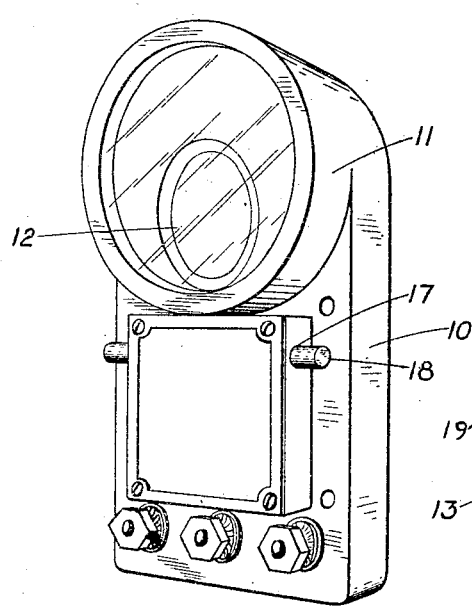
Figure 2:
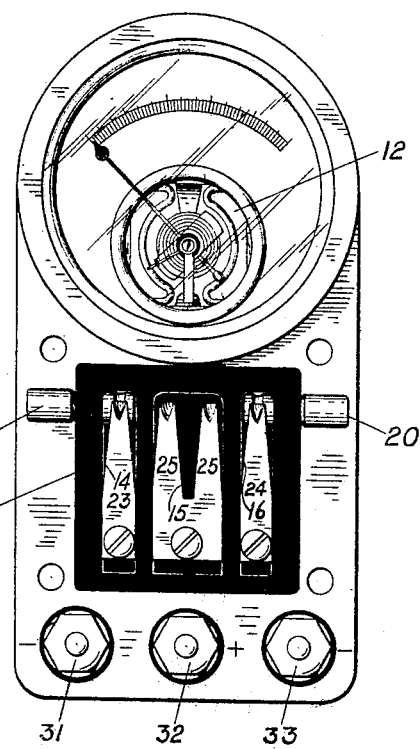
Figure 3:
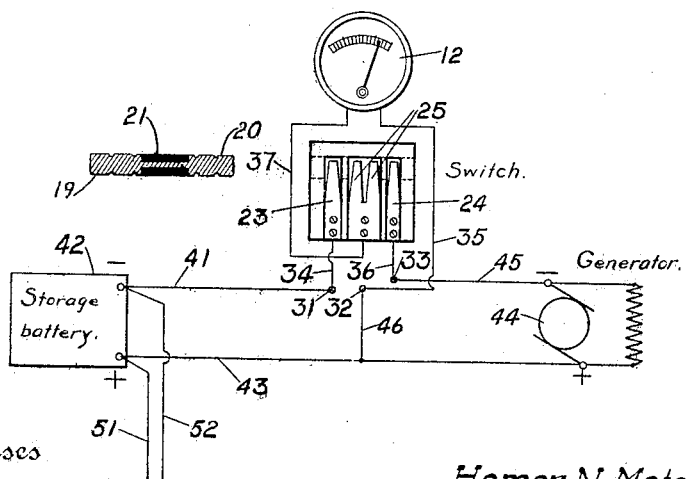

The accompanying drawings illustrate my invention:

Figure 1 is a perspective view of the instrument; Fig. 2 a front elevation (full size) with the front plate of the switch box removed; and Fig. 3 a diagram of the wiring necessary for installation of the instrument.

In the drawings, 10 indicates the main body of the instrument provided with a cylindrical upper portion 11 within which is mounted a current meter 12 of any desirable and proper construction, the meter preferably being a volt meter. Carried by the main body 10, and insulated therefrom, is a switch block 13 which may conveniently be formed of an insulating material such as ebonite, in which are formed three pockets 14, 15 and 16, and extending transversely through block 13 crossing the upper ends of the three pockets, is a passage or bore 17 within which is slidably mounted a switch pin 18 said pin 18 having metallic ends 19 and 20 which are electrically connected through a central insulating portion 21. Mounted in pocket 14 is a spring terminal 23 adapted to engage the metallic end 19 of the switch pin, and mounted in pocket 16 is a spring terminal 24 which is adapted to engage the metallic end 20 of the switch pin, while mounted in the central pocket 15 is a terminal comprising a pair of spring contact fingers 25 25 one of which is adapted to engage the end 19 of the switch pin when it is pushed inward while the other is adapted to engage the end 20 of the switch pin when it is pushed in.

Mounted upon the main body 10 in convenient and accessible position are three binding posts 31, 32 and 33. Post 31 is connected by a wire 34 with terminal 23, post 32 is connected by a wire 35 with the positive side of the current meter 12, and post 33 is connected by a wire 36 with terminal 24. A wire 37 connects terminal 25 with the negative side of the current meter.

In installing this instrument post 31 is connected by a wire 41 with the negative side of a storage battery 42; the positive side of the storage battery is connected by a wire 43 with the positive side of a generator 44; the negative side of the generator is connected by a wire 45 with post 33; and post 32 is connected by a wire 46 with the positive line between the storage battery and generator, this connection being made at any convenient point. Service lines 51 and 52 lead from the storage battery terminals.

The operation is as follows:—By pushing the switch pin to the right (Fig. 2) so that the end 19 connects terminal 23 and terminal 25, a circuit is established as follows;—starting from the positive pole of the storage battery 42, through wires 43 and 46, binding post 32, wire 35, instrument 12, wire 37, terminal 25, switch pin portion 19, terminal 23, wire 34, binding post 31 and wire 41 to the negative side of the battery, thus giving a reading on the current meter from the storage battery without interfering with delivery of the storage battery to the service lines 51, 52. By pushing the switch pin to the left (Fig. 2) the insulating portion of the switch pin comes beneath terminal 23 and the metallic portion 20 connects terminals 24 and 25 thus establishing the following circuit:—from the positive side of generator 44 through wires 43 and 46 to post 32, wire 35 to the current meter, wire 37, terminal 25, switch pin portion 20, terminal 24, wire 36, post 33, and wire 45 to the negative side of the generator 44 thus giving a reading from the generator. If the reading from the generator indicates a higher voltage than the reading from the storage battery, the switch pin may be pushed to its middle position (Fig. 2) thus connecting the terminals 23 and 24 through the connection between switch pin portion 19 and 20 and the following circuit is thereupon established:—from the positive side of the generator to the positive side of the storage battery through wire 43, through the storage battery and wire 41 to binding post 31, wire 34, terminal 23, switch pin portions 19 and 20, terminal 24, wire 36 post 33 and wire 45 to the negative side of the generator whereupon the generator will serve to recharge the storage battery and also serve the service lines 51 and 52. By this means the operator may readily determine whether it is advisable or necessary to connect the generator with the storage battery for recharging.

The instrument is compactly and conveniently arranged ready for easy installation.

I claim as my invention:

1. The combination of a generator, a storage battery, a meter circuit, a meter connected in said meter circuit, a switch block comprising three terminals, a switch pin formed to connect said terminals in pairs, and connections between the generator and one of said terminals, between the storage battery and another of said terminals, between the meter and the other of said terminals, and between the meter and the storage battery and generator, for the purpose described.

2. A switch-meter instrument comprising a main body carrying the following parts, to-wit: an electric meter, three binding posts, three terminals, a switch pin adapted to connect said terminals in pairs, connections between two of said terminals and two of the binding posts, a connection between the remaining binding post and the meter, and a connection between the remaining terminal and the meter.

In witness whereof, I, have hereunto set my hand and seal at Indianapolis, Indiana, this twenty-seventh day of January, A. D. one thousand nine hundred and nine.

HOMER N. MOTSINGER. [L. S.]

Witnesses:
ARTHUR M. HOOD,
THOMAS W. McMEANS.